United States Patent [19]

Maeda et al.

[11] Patent Number: 4,617,350

[45] Date of Patent: Oct. 14, 1986

[54] FLUORINE-CONTAINING RESIN COMPOSITION FOR OPTICAL USE

[75] Inventors: Kazuhiko Maeda; Akira Kawada, both of Tokyo, Japan

[73] Assignee: Central Glass Company, Limited, Ube, Japan

[21] Appl. No.: 826,373

[22] Filed: Feb. 5, 1986

[30] Foreign Application Priority Data

Feb. 20, 1985 [JP] Japan .................................. 60-30621

[51] Int. Cl.$^4$ ....................... C08L 27/16; C08L 33/04
[52] U.S. Cl. .................................... 525/153; 525/200
[58] Field of Search ........................ 525/153, 200, 199

[56] References Cited

U.S. PATENT DOCUMENTS 3,524,906  8/1970  Schmitt et al. ...................... 525/199
4,091,055  5/1978  Kidoh et al. ........................ 525/199

FOREIGN PATENT DOCUMENTS 59-62657  3/1984  Japan .
59-41348  4/1984  Japan .

*Primary Examiner*—Carman J. Seccuro
*Attorney, Agent, or Firm*—Fleit, Jacobson, Cohn & Price

[57] ABSTRACT

A thermoplastic resin composition useful for optical purposes is obtained by blending a polymer of an acrylic ester with a copolymer of vinylidene fluoride (VDF) and hexafluoroacetone (HFA). The blending ratio is not limited, though very good transparency is ensured when the acrylic ester polymer amounts to at least 20 wt %. It is preferable to use a polymer of an acrylic ester with an alkyl alcohol having not more than 4 carbon atoms. When using the resin composition in optical fibers or cylindrical lenses it is suitable to use a VDF/HFA copolymer containing not more than 20 mol % of HFA. The refractive index of a member formed of the resin composition is lower than that of the acrylic ester polymer and falls in the range of about 1.37–1.48. The resin composition is soluble in various organic solvents and accordingly can be used for adhesing and coating purposes too. Besides, this resin composition serves as a thermochromic material.

11 Claims, 4 Drawing Figures

FLUORINE-CONTAINING RESIN COMPOSITION FOR OPTICAL USE

BACKGROUND OF THE INVENTION

This invention relates to a resin composition which is useful for optical purposes and is a blend of two kinds of polymers different in refractive index. One of the two polymers is an acrylic ester polymer and the other a copolymer of fluorine-containing compounds.

Research and development work on optical fibers and related optical devices and materials has been extended and accelerated with the rapid increase in practical applications of optical communication systems. Most of optical fibers already developed to the industrial production stage are formed of quartz glass and/or inorganic multicomponent glass, and some plastics optical fibers also have been developed to a practicable stage.

Advantages of plastics optical fibers reside in good flexibility and ease of fabrication and processing, though these optical fibers are inferior to inorganic glass optical fibers in respect of transmission loss. Accordingly large demand for plastics optical fibers is expected in the field of short-distance optical communications. In a practical sense conventional plastics optical fibers are limited to the step-index type fibers, which consist of a plastics core that exhibits a relatively high index of refraction and a plastics cladding that exhibits a lower index of refraction so that light propagates by repeating reflection at the core-cladding interface. Usually the core material is an acrylic resin represented by poly(methyl methacrylate), and the cladding material is selected from fluoro-polymers that are inherently low in refractivity by the effect of the atomic refraction of fluorine. Examples of useful fluoro-polymers are polyfluoroethylenes and copolymers of vinylidene fluoride with a fluoroethylene.

Researches have been conducted also on plastics optical materials of the graded-index type in which the refractivity is so distributed as to decrease gradually from the central region toward the periphery. Optical materials of this type are attracting increasing interest for use in optical communication cables and also in special lenses. Along with development of new optical devices and materials, need is felt for adhesives and coating materials which exhibit controlled indices of refraction and are useful for optical purposes.

As to means to produce plastics optical materials of the graded-index type or to desirably control the refractive indices of plastics materials, trials have been given to graft copolymerization, photocopolymerization, modification of known polymers by some chemical reaction, and blending of polymers different in refractive index. Among these techniques, blending of a polymer having a relatively high refractive index with another polymer lower in refractivity is deemed simple, easy and widely applicable. However, this method has rarely provided practicable optical plastics. The main reason for the unsuccess is that two kinds of polymers greatly different in refractivity are in most cases poor in mutual solubility, so that a blend of such polymers becomes low in mechanical strength and also in transparency when molded or extruded into a desired shape. Nevertheless, Japanese patent application primary publication No. 59-41348 (1984) shows that a blend of 5–50 wt % of poly(methyl methacrylate), or a copolymer of methyl acrylate and another methacrylate or an acrylate, with 95–50 wt % of a copolymer of vinylidene fluoride and tetrafluoroethylene is a blend system almost perfect in mutual solubility and is useful for optical purposes. According to Japanese patent application primary publication No. 59-62657 (1984), similarly good mutual solubility is exhibited also when a copolymer of vinylidene fluoride and trifluoroethylene was used in place of the copolymer in Japanese 59-41348.

SUMMARY OF THE INVENTION

It is an object of the present invention to provide an optical plastics material, which is a blend of two kinds of polymers having sufficiently different indices of refraction and being good in mutual solubility over a wide range of blending ratio so that the refractive index of the blend is controllable over a wide range, and which can easily be formed into tough, stable and very transparent members of desired shapes.

The present invention provides a resin composition which is suitable for optical uses and consists essentially of a blend of an acrylic ester polymer with a copolymer of vinylidene fluoride and hexafluoroacetone.

In this invention the acrylic ester polymer is usually a homopolymer of an acrylic acid ester with an alkyl alcohol having not more than 4 carbon atoms. If desired it is also possible to use a copolymer of at least two kinds of acrylates.

We have chosen an acrylic ester polymer as the basic component of a new optical plastics material mainly because acrylic ester polymers are generally high in transparency and exhibit appropriate indices of refraction. For example, poly(ethyl acrylate) exhibits a refractive index of about 1.47 at 20° C. There are many kinds of fluoro polymers and copolymers having lower indices of refraction than acrylic ester polymers. However, we have discovered that copolymers of vinylidene fluoride (VDF) with hexafluoroacetone (HFA) are distinctly good in mutual solubility with acrylic ester polymers over a very wide range of blending ratio, and that the obtained blends are thermoplastic resins which can readily be molded or otherwise shaped into very transparent members having good mechanical properties and weather resistance. In general it is suitable to use a VDF/HFA copolymer comprising 1–50 mol % of HFA, and it is preferable to limit the maximum amount of HFA to 20 mol % when the resin composition in molded or extruded form is required to possess good mechanical strength. The blending ratio of an acrylic ester polymer to a VDF/HFA copolymer can freely be varied over the range from 99:1 to 1:99 by weight, though it is preferable to limit the maximum amount of the copolymer to 80 wt % where very high transparency is required.

The refractive index of a member formed of a resin composition according to the invention falls in the range from about 1.37 to about 1.48 and can freely be controlled by controlling the weight ratio of the acrylic ester polymer to VDF/HFA copolymer.

By utilizing excellent transparency and controllable indices of refraction, resin compositions according to the invention can be used for various light transmitting devices and optical circuit elements such as optical fibers of the graded-index type, cladding of optical fibers of the step-index type and plastic lenses including cylindrical lenses. Besides, resin compositions according to the invention can be used as transparent adhesives, which exhibit controlled indices of refraction and are suited for optical purposes, by utilizing good adhesing property of acrylic ester polymers and good solubilities of the blended resin compositions in various organic solvents. Also it is possible to form a resin composition of the invention into a transparent cast-film by a solution cast method. Furthermore, solutions of the same resin composition can provide paint films or coating films resistant to weathering since VDF/HFA copolymers are excellent in weatherability and chemical resistance.

A resin composition according to the invention can be used as a thermochromic material. That is, a blend of an acrylic ester polymer with a VDF/HFA copolymer has a transition temperature above which the two components of the blend lose mutual solubility so that the blend becomes opaque. As the temperature lowers the blend recovers mutual solubility and transparency. Examples of known thermochromic materials that undergo a change in color tone when heated to a definite temperature are spiropyrans, pianthrones, imidazolines and some azo compounds. So far as these thermochromic materials are used it is impossible to arbitrarily adjust the thermochromic transition temperature. In the cases of the blends according to the invention it is possible to arbitrarily adjust the thermochromic transition temperature within the range of from about 80° C. to about 270° C. by selecting the alcohol component of the acrylic ester and/or by controlling the molecular weights of the polymers to be blended and the blending ratio.

DESCRIPTION OF THE PREFERRED EMBODIMENTS

Figure 1:
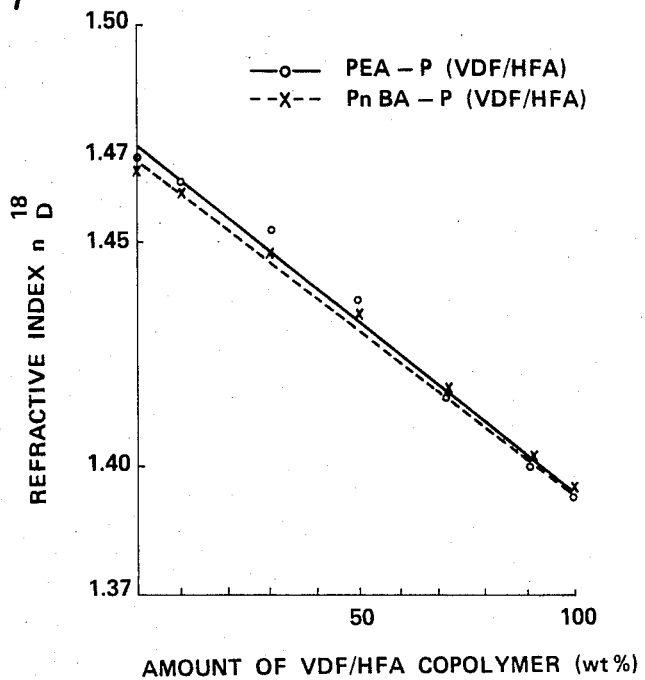
FIG. 1 is a graph showing the dependence of the refractive index of a resin composition according to the invention on the content of the fluoro copolymer.

The acrylic ester polymer used in this invention is usually selected from homopolymers of acrylates which are easily obtained by a popular radical polymerization method and are commercially available. It is preferable to use a polymer of an ester of acrylic acid with an alkyl alcohol having 1 to 4 carbon atoms, such as methyl acrylate, ethyl acrylate, n-propyl acrylate, isopropyl acrylate, n-butyl acrylate, isobutyl acrylate or t-butyl acrylate. It is also possible to use a copolymer of at least two kinds of acrylate monomers with a view to improving some properties of the resin composition such as, for example, mechanical characteristics, workability and/or adhesing property. Preferably the comonomers are selected from alkyl acrylates having 1 to 4 carbon atoms in the alkyl group, though useful comonomers include various acrylates such as 2-ethylhexyl acrylate, n-octyldecyl acrylate, n-dodecyl acrylate. 2-hydroxyethyl acrylate, 2-hydroxypropyl acrylate, β-ethoxyethyl acrylate, 2-cyanoethyl acrylate, cyclohexyl acrylate, dimethylaminoethyl acrylate, diethylaminoethyl acrylate. lauryl acrylate, stearyl acrylate, isoamyl acrylate, glicydyl acrylate, allyl acrylate and benzyl acrylate. Furthermore, it is permissible to incorporate a methacrylate into the copolymer by making a selection among methacrylates corresponding to the above listed acrylates.

A copolymer of VDF with HFA for use in this invention can be prepared by radical copolymerization reaction in an organic liquid medium using an oil-soluble polymerization initiator. A suitable range of the molar ratio of VDF to HFA is variable depending on intended uses of the resin composition obtained by blending the copolymer with an acrylic polymer. When the resin composition is to be used in optical devices that are required to have sufficiently high mechanical strength such as optical fibers and lenses, a preferable range of the molar ratio of VDF to HFA is from 99:1 to 80:20. When the resin composition is to be used as an adhesive or a coating material for optical purposes, a suitable range of the molar ratio of VDF to HFA expands to from 99:1 to 50:50.

Blending of an acrylic ester polymer with a VDF/HFA copolymer can be accomplished by any method that is applicable to blending of conventional thermoplastic polymers. For example, the two polymers are blended and kneaded under appropriate heating in a conventional mixer such as Henschel mixer, V-type blender, ribbon blender or planetary mixer. A solution blending method is also practicable since there are many kinds of organic solvents in which both polyacrylates and VDF/HFA copolymers are well soluble. Examples of such solvents are dimethylacetamide, dimethylformamide, acetonitrile, tetrahydrofuran, some ketones represented by acetone and some esters represented by ethyl acetate. The blending is accomplished by the steps of dissolving a selected acrylic ester polymer and a VDF/HFA copolymer in a selected solvent, pouring the mixed solution into either water or a suitable organic liquid such as methanol to cause precipitation of a desired blend and drying the precipitate.

The obtained blend or resin composition is a thermoplastic material that can easily be formed into desired solid shapes by using conventional shaping methods for thermoplastic resins, such as extrusion, compression molding, injection molding or calendering. In the shaping operation it is suitable to keep the resin composition heated at 80°–300° C., and preferably at 120°–200° C., depending on the kinds of the ingredients and the blending ratio. It is also possible to obtain a highly transparent cast-film of the resin composition by spreading a mixed solution of an acrylic resin and a VDF/HFA copolymer in an organic solvent selected from the above named ones on a glass plate or an alternative substrate and then evaporating the solvent.

It is characteristic of VDF/HFA copolymers to be soluble in many kinds of acrylate monomers. By utilizing this property of VDF/HFA copolymers it is possible to accomplish preparation of an acrylic ester polymer and blending of that polymer with a VDF/HFA copolymer simultaneously. That is, a desired blend can be obtained by first dissolving the VDF/HFA copolymer in an acrylate monomer and, after adding a radical polymerization initiator, keeping the solution heated until completion of polymerization of the acrylate. In such a case it is possible to perform the polymerization of the acrylate by photopolymerization using ultraviolet rays.

The invention will further be illustrated by the following nonlimitative examples.

EXAMPLE 1A

Either poly(ethyl acrylate) (PEA) or poly(n-butyl acrylate) (PnBA) was blended with a VDF/HFA copolymer in which the molar ratio of VDF to HFA was 91:9 in a variable proportion. For each of PEA and PnBA the tested proportions of the VDF/HFA copolymer to the polyacrylate were 90:10, 70:30, 50:50, 30:70 and 10:90 by weight. Each blend sample was prepared by the following method.

First, predetermined quantities of the VDF/HFA copolymer and the selected polyacrylate were dissolved in tetrahydrofuran to obtain a solution in which the total concentration of the polymers was 1–3 wt %. After stirring for 2 hr at room temperature the solution was dropped into a mixture of water and methanol to cause precipitation of an intimate blend of the VDF/HFA copolymer with PEA or PnBA. The precipitate was washed and dried at 60° C. for 24 hr to thereby obtain a powder of the desired blend.

Each blend sample was press-shaped at 150°–180° C. by application of a pressure of 200 kgf/cm² into a film having a thickness of about 0.1 mm. The obtained films were all transparent irrespective of the blending ratio.

On the film of every blend the refractive index ($n_D^{18}$) was measured with Abbe's refractometer Type 2 using the D-line of the sodium spectrum and methyl salicylate ($n_D^{20} = 1.53$) as the intermediate liquid. The test piece used for calibration had a refractive index of ($n_D^{20}$) of 1.74. For comparison, the same measurement was made also on PEA, PnBA and the VDF/HFA copolymer each in the form of an about 0.1 mm thick film produced by the above described method. The results are shown in Table 1 and also in FIG. 1.

TABLE I

| Blending Ratio | | Refractive Index $n_D^{18}$ | |
|---|---|---|---|
| VDF/HFA Copolymer (wt %) | PEA or PnBA (wt %) | using PEA | using PnBA |
| 0 | 100 | 1.469 | 1.467 |
| 10 | 90 | 1.464 | 1.462 |
| 30 | 70 | 1.453 | 1.448 |
| 50 | 50 | 1.457 | 1.434 |
| 70 | 30 | 1.415 | 1.416 |
| 90 | 10 | 1.399 | 1.400 |
| 100 | 0 | 1.393 | 1.393 |

Figure 2:
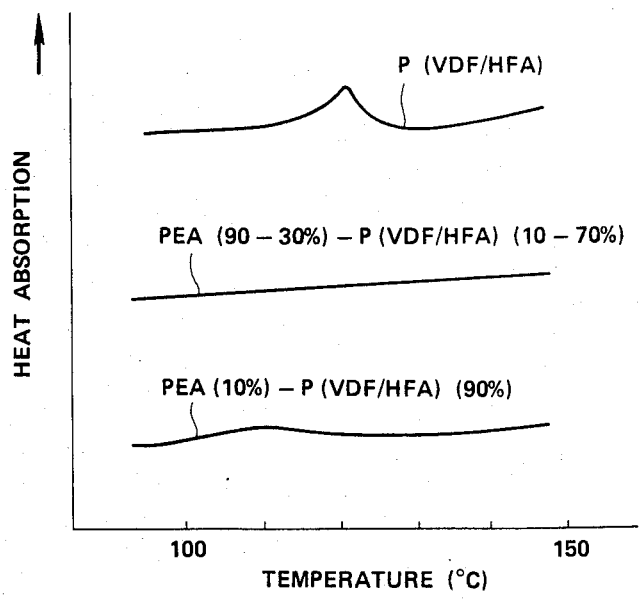
FIG. 2 is a chart showing calorimetric characteristics of examples of resin compositions according to the invention and a fluoro copolymer used as a raw material.

Furthermore, samples of the blends of the VDF/HFA copolymer with PEA and the VDF/HFA copolymer itself were subjected to thermal analysis by differential scanning calorimetry (DSC). The results are shown in FIG. 2. In the case of the VDF/HFA copolymer a melt-indicating peak ($T_m$) appears in the DSC chart. This is indicative of the existence of a crystalline phase in the copolymer sample. In the case of the blend obtained by replacing 10 wt % of the VDF/HFA copolymer by PEA there appears only a very lower and unclear melt-indicating peak at a considerably low temperature. In the cases of the blends containing larger amounts of PEA no melt-indicating peak was observed. This means vanishment of the crystalline phase, and it was confirmed by X-ray diffraction analysis and also by measurement of dynamic viscoelasticity. From these experimental results it is deduced that uniform mixing of the two components on the level of molecular chain is necessary for acquirement of good transparency.

EXAMPLE 1B

The VDF/HFA copolymer (molar ratio 91/9) was blended with PEA by dissolving both polymers in dimethylacetamide. The blending ratio was variable as shown in Table 2. At each blending ratio a cast-film having a thickness of 100 μm was formed by a coating method using the mixed solution, and every sample film was subjected to measurement of light transmittance with a Shimadzu UV-365 spectrometer by using visible light of 500 nm wavelength. For comparison, the same measurement was made on the VDF/HFA copolymer and PEA each in the form of a 100 μm thick cast-film. The results are shown in Table 2.

COMPARATIVE EXAMPLE

Poly(vinylidene fluoride) (PVDF) and PEA were blended at various blending ratios as shown in Table 2. Each blend was prepared by dissolving both polymers in dimethylacetamide and was formed into a 100 μm thick cast-film from the solution. On the cast-films the measurement of light transmittance was made in accordance with Example 1B. The results are shown in Table 2.

TABLE 2

| Blending Ratio | | Light Transmittance (%) | |
|---|---|---|---|
| PEA (wt %) | VDF/HFA Copolymer or PVDF (wt %) | using VDF/HFA Copolymer (Ex. 1B) | using PVDF (Comp. Ex.) |
| 0 | 100 | 72 | 64 |
| 10 | 90 | 84 | 71 |
| 30 | 70 | 90 | 76 |
| 50 | 50 | 91 | 85 |
| 70 | 30 | 91 | 90 |
| 90 | 10 | 92 | 90 |
| 100 | 0 | 93 | 93 |

As can be seen in Table 2, when PEA was blended with the VDF/HFA copolymer the blends retained very good transparency of PEA until the amount of the VDF/HFA copolymer was increased to more than 70 wt %. However, in blending PEA with PVDF the amount of PVDF had to be limited to about 30 wt % if it was desired to maintain the transparency of the blends at a fairly high level. This is an important advantage of using a copolymer of VDF with HFA.

EXAMPLE 2

The VDF/HFA copolymer (molar ratio 91/9) was dissolved in ethyl acrylate monomer, which was refined by distillation in advance, so as to obtain 10 wt % solution of the copolymer. As a radical copolymerization initiator, 0.5 wt % of benzoyl peroxide was dissolved in the solution. The solution was put into a glass reaction tube having an inner diameter of 10 mm, and the gas atmosphere in the apparatus including the reaction tube was completely replaced by nitrogen gas. After that the solution in the reaction tube was kept heated at 80° C. for 5 hr to thereby accomplish polymerization of ethyl acrylate. As the result the solution turned into a transparent solid cylinder which was formed of a blend of PEA with the VDF/HFA copolymer.

An about 1 mm thick disc was cut out of the obtained cylinder. After polishing, the refractive index of this disc was measured to be 1.462 at 18° C. By measurement with the spectrometer mentioned in Example 1B, the light transmittance of this disc at room temperature was 79%.

EXAMPLE 3

The VDF/HFA copolymer (molar ratio 91/9) was blended with PEA at blending ratio of 50:50 by weight by dissolving both polymers in tetrahydrofuran, and the blend was formed into a 100 μm thick cast-film by a coating method using the mixed solution.

Figure 3:
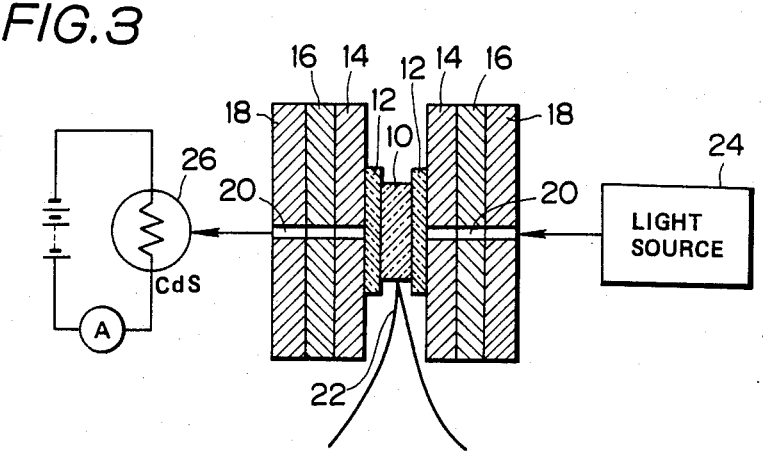
FIG. 3 is a schematic illustration of a light transmittance measuring device.

At various temperatures ranging from about 100° C. to about 200° C., light transmittance of the blend in the film form was measured by using a device shown in FIG. 3. Each film sample 10 was sandwiched between two sheets of transparent glass 12, and a copper plate 14 was placed on the outer side of each glass sheet 12. A heater plate 16 was placed on each copper plate 14. and a copper plate 18 was placed on each heater plate 16. A hole 20 having a diameter of 5 mm was bored through the laminate of the copper plates 14, 18 and the heater plate 16 on each side of the film sample 10 such that the two holes 20 were in axial alignment and were directed normal to a central area of the film sample 10. The copper plates 14, 18 were used to rapidly establish thermal equilibrium in the film sample 10 when the heaters 16 were energized. Numeral 22 indicates a thermocouple. A light source 24 and a CdS photoconductor cell 26 were arranged on the axis of the holes 20. For each film sample 10, light transmittance was measured while the temperature was gradually raised and then gradually lowered.

Figure 4:
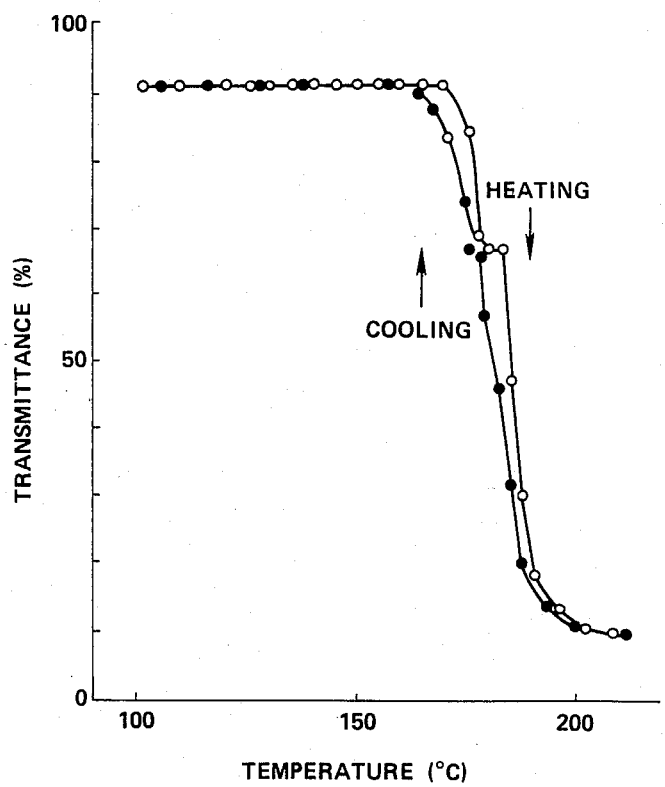
FIG. 4 is a graph showing the relationship between temperature and light transmittance in an example of resin compositions according to the invention.

As shown in FIG. 4, the transmittance sharply lowered as the temperature was raised beyond 170° C. and returned to the initial high level when cooled to about 170° C. Repeating the same test on a number of samples, good reproducibility of this phenomenon was confirmed. Thus, the tested blend proved to be a thermochromic material having a transition temperature of about 170° C.

Additional experiments were carried out by using different kinds of polyalkyl acrylates in place of PEA in Example 3. The blending ratio of each polyacrylate to the VDF/HFA copolymer was always 50:50 by weight. The tested acrylic ester polymers were poly(methyl acrylate), poly(propyl acrylate) and poly(butyl acrylate) besides the already tested poly(ethyl acrylate). That is, the number of carbon atoms in the alkyl group of alkyl acrylates varied over the range of from 1 to 4. By measuring changes in the transmittances with temperature, the thermochromic transition temperatures of the tested blends of the VDF/HFA copolymer with a polyalkyl acrylate were found to be as shown in Table 3. It is apparent that the thermochromic transition temperature depends on the number of carbon atoms in the alkyl group of the used acrylate.

TABLE 3

| Alkyl in Polyacrylate | Thermochromic Transition Temperature of Blend (°C.) |
|---|---|
| $-CH_3$ | 190 |
| $-C_2H_5$ | 170 |
| $-C_3H_7$ | 140 |
| $-C_4H_9$ | 110 |

What is claimed is:

1. A resin composition suitable for optical uses, consisting essentially of a blend of an acrylic ester polymer with a copolymer of vinylidene fluoride and hexafluoroacetone.

2. A resin composition according to claim 1, wherein the molar ratio of vinylidene fluoride to hexafluoroacetone in said copolymer is in the range from 99:1 to 50:50.

3. A resin composition according to claim 2, wherein said molar ratio is in the range from 99:1 to 80:20 .

4. A resin composition according to claim 1, wherein said acrylic ester polymer is a polymer of an ester of acrylic acid with an alkyl alcohol having not more than 4 carbon atoms.

5. A resin composition according to claim 1, wherein said acrylic ester polymer is a copolymer of at least two kinds of acrylate.

6. A resin composition according to claim 5, wherein at least one of said at least two acrylates is an alkyl acrylate having not more than 4 carbon atoms in the alkyl group.

7. A resin composition according to claim 5, wherein at least one of said at least two acrylates is selected from the group consisting of 2-ethylhexyl acrylate, n-octyldecyl acrylate, n-dodecyl acrylate, 2-hydroxyethyl acrylate, 2-hydroxypropyl acrylate, β-ethoxyethyl acrylate, 2-cyanoethyl acrylate, cyclohexyl acrylate, dimethylaminoethyl acrylate, diethylaminoethyl acrylate, lauryl acrylate, stearyl acrylate, isoamyl acrylate, glicydyl acrylate, allyl acrylate and benzyl acrylate.

8. A resin composition according to claim 7, wherein one of said at least two acrylates is an alkyl acrylate having not more than 4 carbon atoms.

9. A resin composition according to claim 1, wherein the weight ratio of said acrylic ester polymer to said copolymer is in the range from 99:1 to 20:80.

10. A resin composition according to claim 1, wherein said blend is solidified from a heated and fluidized state.

11. A resin composition according to claim 1, wherein said blend is solidified from a solution thereof by removing solvent from the solution.

* * * * *